United States Patent Office 2,978,402
Patented Apr. 4, 1961

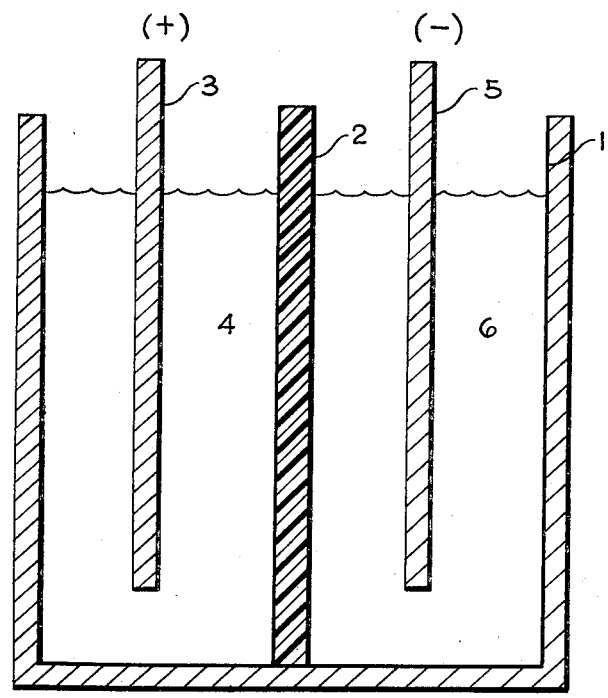

2,978,402

PERMSELECTIVE MEMBRANES

Paul E. Hoch, Niagara Falls, and Paul Robitschek, Buffalo, N.Y., assignors to Hooker Chemical Corporation, Niagara Falls, N.Y., a corporation of New York Filed Apr. 16, 1956, Ser. No. 578,174

20 Claims. (Cl. 204—301)

This invention relates to new permselective membranes and to processes for producing them. More particularly this invention relates to new permselective membranes exhibiting chemical, electrical, electrochemical, ion-exchange, permselective, physical, and mechanical properties of such nature as to render them suited for use in industrial processes.

The use of granulated ion-exchange resins to remove various ions from a solution has been known to the art for some time. More recently a new use for ion-exchange resins was developed and is becoming increasingly more important. In this new use the ion exchange resin is fabricated into the form of a sheet or pellicle. It was found that this sheet selectively allows certain ions to pass through while preventing the passage of other types of ions. In effect, the sheet acts as an ionic sieve. This property is called permselectivity.

Many uses have been found for permselective membranes. One use is the purification of sea water by removing the salts therefrom. Another use is the concentration of dilute spent pickling acids, waste salts, and alkalis which result as by-products of chemical processes. Still another use is the demineralization of proteins. Another use is the separation of ions such as amphoteric ones from non-amphoteric ones, and certain ions from others having different mobility or electron charges. Another use which has become most important is the decomposition of ionic solutions by electrolysis where it is desired to maintain the decomposition products separate from one another. An important example is the electrolysis of sodium chloride solution where it is desired to keep the sodium hydroxide which is produced separate from the reactant sodium chloride. Another example is the production of substantially pure carbonates during electrolysis by introducing carbon dioxide into caustic solutions which are maintained substantially free of chloride ions.

A number of permselective membranes for the purposes set out above have been disclosed in the prior art. Some workers have used sulfonated phenolic resins. Phenolic resins, however, have been found to be insufficient to withstand the rigors of electrolysis in the presence of caustic soda and chlorine.

Most of the attempts in the art to provide permselective membranes suitable for use in electrolysis have been made with ion-exchange resins in their commercially available form. There the resin is generally in the form of beads, and is so prepared that it has the maximum number of ion-exchange groups per unit weight of resin. This is necessary to give the resin a high ion-exchange capacity. In the case of a permselective membrane, however, it is not necessary that the membrane contain the greatest possible concentration of ion-exchange groups. Only sufficient groups are needed to provide the necessary conductivity and ionic transfer. Consequently the concentration of the ion-exchange groups may be somewhat reduced in order to provide increased structural strength. To improve the structural strength and to limit the number of functional groups within the membrane it has been the practice of the prior art generally to produce what is called a heterogeneous membrane, that is, one wherein clumps or beads of ion-exchange resin are scattered throughout an inert resinous membrane. This tends to increase the strength of the membrane somewhat, but has had an unfavorable effect upon the other properties, since it is virtually impossible by this method to provide a sufficiently uniform dissemination of ion-exchange groups throughout the membrane. This method results in a membrane which has areas of high ion-exchange group concentration surrounded by other areas containing no ion-exchange groups whatever. As a result, when the membranes are immersed in the electrolytic solution, the high concentration areas absorb a large amount of water while the low concentration areas absorb none. This results in severe strains and stresses being produced within the membrane and eventually results in the membrane's rupture and subsequent failure. Another disadvantage is that the conductivity of a membrane of this type is unsatisfactorily low. Because of these limitations the heterogeneous type of membrane has not enjoyed wide commercial acceptance.

With respect to the homogeneous membranes, that is, membranes wherein the individual ion-exchange groups are uniformly distributed throughout the membrane, the results obtained in the art to date have here also proved successful only for limited applications. These membranes have been mainly comprised of phenolic resins containing substituted sulfonic acid groups. They have been unable to withstand the rigors of many electrolytic processes because of the inherent inability of phenolic resins to withstand chemical attack. In addition, these resins, according to their proponents, must be produced with a certain amount of solvent present at all stages of the process, thus greatly increasing the difficulties and cost of production.

It is an object of this invention to provide new cation permselective membranes. It is also an object to provide such membranes which have good conductivity. It is a further object of this invention to provide such membranes which have excellent mechanical properties rendering them suitable for industrial operations, especially where the membrane is subject to attack by corrosive reactants and products. It is still a further object of this invention to provide such permselective membranes which will contain the ion-exchange groups uniformly distributed throughout the membrane and chemically combined with the resin molecules. It is also an object of this invention to provide a permselective membrane which may be fabricated substantially free from any liquid solvent and maintained so until just prior to its use in a cell. Still further objects will become apparent to those skilled in the art on further consideration of the disclosure made hereinafter.

It has now been found that homogeneous permselective membranes containing the desired properties for use in industrial applications may be produced by copolymerizing a mixture comprising (A) a composition selected from the group consisting of (1) an olefinic monomer containing a carboxyl group, and (2) a mixture of an olefinic monomer containing a group which may be subsequently hydrolyzed to form a carboxylic acid group and an olefinic carboxylic compound; (B) an olefinic monomer free from potentially active ion-exchange groups; (C) an olefinic monomer containing at least two carbon-to-carbon double bonds; and (D) a polymerization catalyst. The copolymer thus formed in the shape of a pellicle or membrane is substantially free from water. In accordance with this invention the membrane is then treated in an aqueous solution in the presence of a hydrolysis catalyst such as sodium hydroxide to convert the potentially active functional groups to carboxyl groups or salts thereof, and to introduce water into the membrane. It has been found that membranes produced in this manner have inherently good physical properties, high efficiency in selectively transferring ions, and good conductivity.

As used in the paragraph above and throughout the specification and claims the terms have the following meanings. "Carboxyl groups" include the groups in their acid form containing hydrogen, in their anhydride form, and in their salt form where the hydrogen is replaced by a metal. The term "carboxylic compound" is limited to the group consisting of carboxylic acids, carboxylic anhydrides, carboxylic acid chlorides and carboxylic salts. The term "group which may be subsequently hydrolyzed to form a carboxyl group" comprises such groups as esters and amides of a carboxylic acid, and nitrile groups, all of which upon treatment with the proper hydrolyzing medium may be converted into carboxylic acids or salts thereof. The term "monomer free from a potentially active ion-exchange group" means that there is no group attached to the monomer which upon treatment in any manner such as by hydrolysis will form a group which would act as an ion exchange group. The term "potentially active ion-exchange groups" include esters, amides, or acid chlorides of carboxylic acids, nitrile groups, carboxylic acid and anhydride groups, or any other group which may be treated such as by hydrolysis to form carboxyl ion-exchange groups or having ion-exchange properties. "Free from liquid solvents" means free from solvents such as water, toluene, benzene, diethylbenzene, alcohols such as isopropanol, ketones such as cyclohexanone, ethers such as dioxane, halogenated hydrocarbons such as ethylene chloride, hydrocarbons such as heptane and in general, any liquid which will dissolve in the resinous mixture but will not copolymerize therewith. Also, as used in the specification and claims, the term "membrane" includes "sheet" or "pellicle."

Reference is made to the figure which is given to illustrate a preferred use of our invention in the electrolysis of chemical compounds, but is not to be construed as limiting, except as defined in the appended claims. A container 1 is divided by the permselective diaphragm 2 of our invention into an anode compartment containing an anode 3 in contact with anolyte 4, and a cathode compartment containing a cathode 5 in contact with catholyte 6.

The membrane formed by the present invention comprises an addition copolymer of several monomers, with the active ion-exchange groups homogeneously distributed throughout the membrane in such a manner that the strength of the membrane is not adversely affected thereby. The potentially active functional groups of the ion-exchange-active monomer may be either carboxyl groups or groups which may be hydrolyzed subsequent to the polymerization to produce carboxyl groups. In every case however, the ultimate active ion-exchange group will be a carboxyl group. Where the ion-exchange active monomer as originally introduced already contains the carboxyl group attached thereto, subsequent hydrolysis is of course, then unnecessary and the membranes need only to be treated to introduce water and the desired cations.

The permselective membranes of this invention are prepared generally by mixing together the desired monomers with a polymerization catalyst, and maintaining the mixture at the necessary polymerization temperature in the absence of any liquid solvent until a hard sheet-like copolymer forms. The monomeric mixture is made up of several components. The first is an olefinic polymerizable monomer which either contains a carboxyl group attached thereto or else contains a group which may subsequently be hydrolyzed to produce a carboxyl group. The second component is an olefinic polymerizable monomer which contains neither a carboxyl group, nor any group which may be hydrolyzed to form a carboxyl group, nor any other ion-exchange functional group. This component acts as a diluent. The third component consists of a difunctional olefinic group-containing-monomer which will cross-link the polymer chains of the composition when cured together in the presence of a polymerization catalyst. The cured membranes thus formed by the preceding process are solid sheet-like membranes which are substantially free from any liquid solvent. In order to introduce water within the structure and to hydrolyze the carboxyl-forming groups, the membrane is then treated in a hydrolyzing medium such as aqueous sodium hydroxide. This succeeds in converting the carboxyl-forming groups into functional ion-exchange carboxyl groups, and also succeeds in introducing water of hydration, rendering the membrane electrically conductive. The resulting membrane is now capable of selectively passing cations while at the same time repelling anions. It now constitutes a copolymer to which there are attached at uniform intervals throughout the membrane functional ion-exchange groups which are either carboxyl groups or salts thereof.

The thickness of the membranes made by this invention is not critical, but will depend upon the desired use. In general, suitable membranes may be from as little as about one-sixteenth inch to as much as about one inch thick. A thick membrane will have a longer useful life. However, the resistance of the membrane increases proportionally to its thickness and if the membrane is made increasingly thicker, a value will be attained above which the resistance is too great for practical use.

The functional monomer should be an olefinic compound selected from the group consisting of carboxylic acids, carboxylic anhydrides, carboxylic chlorides, carboxylic esters, carboxylic amides, nitriles, and mixtures thereof. Among the carboxylic acids and anhydrides which may be used are acrylic and methacrylic acid, maleic acid and anhydride, fumaric acid, itaconic acid and anhydride, cinnamic acid and anhydride, vinyl benzoic acid and its anhydride, crotonic and isocrotonic acid and their anhydrides, butanoic acid, luconic acid, alpha hydrocinnamic acid, aconitic acid, chloromaleic acid and its anhydride, ethyl maleic acid and its anhydride etc. Among the esters are methyl acrylate, ethyl acrylate, 2-ethyl-hexyl acrylate, the esters of methacrylic acid, the esters and half esters of maleic and fumaric acid, such as methyl and ethyl maleates, and ethyl and methyl fumarates. Unsaturated acids such as acetylene dicarboxylic acid which contain triple bonds may also be used. In addition, the amides and acid chlorides of the above named acids and anhydrides may also be used. Among the nitriles, acrylonitrile may be used.

The proportion of the ion-exchange-group-containing monomer used determines the ion-exchange functional group capacity and consequently must be kept within well defined limits. The ion-exchange functional group capacity, such as when measured by the milliequivalents of ion-exchange radical per gram of dry resin, is an important factor in the determination of both the strength properties of the membrane and its electrical conductivity. The higher the functional group capacity, the greater will be the water content and swelling pressure of the membrane during and after hydrolysis when measured at any given external electrolytic concentration. For instance when the milliequivalent capacity per gram is over 6.0, the polymerized and hydrolyzed membrane has generally lower structural strength. As this value of milliequivalent capacity per gram becomes lower the hydrolyzed membrane becomes more rigid. The range of functional group capacity should be between about 1.0 and 6 milliequivalents of ion-exchange radicals per gram of dry polymerized resin. The preferred range is about 2.5 and 3.0 milliequivalents.

The diluent component, for example styrene, has an important function in the permselective membrance. First, it serves to decrease the ion-exchange functional group concentration and thereby decrease the swelling stress produced within the membrane at the time it is hydrolyzed and during the time it is operating in contact with the ionic solution. Additionally, as the diluent content increases, the structural rigidity, inertness, and strength of the membrane also increases. For instance, a membrane containing a 27 mole percent styrene content has a 126 percent volume change upon hydrolysis. A membrane containing a 64 percent styrene content has only a 12 percent volume change upon hydrolysis. This latter sheet is much more rigid and easier to handle. The only limiting consideration of the inert diluent concentration is that, as the diluent content is increased, the conductivity of the membrane decreases proportionally. Thus, the diluent content cannot be increased beyond the point where the conductivity goes below the useful level. The preferred range of the diluent is between about 50 and 85 mole percent, although a range of 25 percent to 90 percent may be used in some cases. When it becomes much less than 50 the strength of the membrane begins to fall off. When it is greater than 85 mole percent the resistance of the membrane becomes too high as there is then not a sufficiently high concentration of ion-exchange groups.

The diluent may comprise one or more of the following: styrene, vinyl naphthalene, ethyl vinyl ether, isobutyl vinyl ether, methyl styrenes such as alpha methyl styrene, butadiene, isoprene, chloroprene, chlorostyrenes, fluorostyrenes, chlorinated ethylenes, vinyl chloride, vinylidene chloride, etc. Fluorine-containing olefinic monomers such as trichlorofluoroethylene, dichlorodifluoroethylene, and tetrafluoroethylene may be used if low temperature or high pressure polymerization conditions are maintained.

It is desirable in most cases to cross-link the polymers of the invention to form an insoluble infusible membrane. This is accomplished by introducing into the polymerizable mixture a polyfunctional cross-linking agent, containing at least two olefinic double bonds such as divinylbenzene. The cross-linking has a pronounced effect upon the rigidity of the polymer and thus aids in controlling the swelling stress during hydrolysis and increasing the physical strength of the membrane. It has been observed that 4 mole percent content of divinylbenzene gives sheets which are more brittle than those containing 2 percent or less. The effect of the cross-linking agent is closely interlocked with the relative amount of the inert monomer. As the amount of inert monomer is increased, the amount of cross-linking agent may be decreased without any adverse effect upon the strength or rigidity of the final membrane. In fact, where the amount of inert monomer is increased to greater than 65 percent, satisfactory membranes may be produced even in the absence of any cross-linking agent. The preferred proportion of the cross-linking agent is between about 0.25 and 4.0 mole percent, although a range of 0.1 to 8.0 mole percent may be used. Other cross-linking monomers that may be used are divinyl ether, butadiene, and other aliphatic diolefins or polyolefins.

The polymerization catalyst may be any of a large number of common addition polymerization catalysts. The preferred catalysts are free radical polymerization catalysts such as benzoyl peroxide, organic hydroperoxides, such as cumyl hydroperoxide, and peroxides such as dicumyl peroxide. In some cases the ionic polymerization catalyst may be used such as boron trichloride etherate, aluminum chloride, stannic chloride, and others. The catalysts may be used in any amounts generally disclosed in the prior art. As little as one-tenth of one percent based on the weight of the copolymer may be employed successfully. There is no critical upper limit. However, little may be gained by exceeding three percent. The preferred range is from about one to about one and one-half percent by weight based on the total polymer.

The membranes of the present invention may be fabricated from the mixture of monomers in any one of many techniques which are known to the art. One method is to cast the liquid mixture in a mold and heat the mold until the polymerization is complete. This is very conveniently done between two glass plates. One problem which presents itself in using the casting technique is that an appreciable shrinking or reduction in volume occurs during the curing process which in some cases may reach 20 percent or more of the original volume. If a rigid mold is used, imperfections such as voids, fissures and cracks may result during the casting. One method that has proved successful for avoiding this problem is to separate the glass plates forming the sides of the mold with a flexible gasket material such as rubber tubing. The mold may then be placed in a bolted frame and coil springs placed over each bolt to exert the force upon the mold sides, tending to make them follow the dimensions of the curing polymer.

The dry membrane prepared by the methods described above must then be treated in a hydrolyzing medium. This treatment has two important functions. First, it introduces water of hydration into the membrane and allows the membrane to become electrically conducting. Second, it hydrolyzes the potentially active functional groups such as the carboxylic esters, amides, chlorides, and the nitrile groups to carboxyl groups or salts thereof. This renders these groups capable of acting as ion-exchange groups. It is generally preferred that the hydrolyzing medium be an aqueous solution of a strong base such as sodium or potassium hydroxide. In some cases, however, strong acid solutions may be used, although they may necessitate a longer treatment. The concentrations of the hydrolyzing media are not critical but should generally be at least 5 percent by weight of the alkali or acid based on the weight of the solution. The time of treatment varies depending upon the membrane composition. It may vary from several hours to as much as several days. The preferred temperature is from about 85 degrees to about 100 degrees centigrade, although lower or higher temperatures may be used. Subsequent to the hydrolysis treatment the membrane may be placed in the cell in which it is to function. However, in order to condition it, the membrane may, subsequent to hydrolysis and prior to use in a cell, be treated in a solution which contains the same ions at approximately the same activities as those of the solution in the electrolytic cell in which the membrane is subsequently to function.

It has been found that in order to facilitate the hydrolysis process of a membrane which has been prepared free from any liquid solvent according to this invention and where the functional component is in the form of a monomer containing a group which may be hydrolyzed to form a carboxyl group, it is necessary to admix an unsaturated organic acid or anhydride prior to the polymerization. This material should preferably be an olefinic compound and may be selected from the group consisting of carboxylic acids, carboxylic anhydrides, and mixtures thereof. Among the compounds which are suited for this purpose are acrylic acid, maleic anhydride, citraconic anhydride, aconitic anhydride, itaconic anhydride, etc. The amount of this material added should be at least about one percent by weight based on the total polymer.

The permselective membranes of this invention have many advantages over those of the prior art. First, the copolymer formed is of such a composition that it is very effective in resisting the corrosive action of the extremely reactive products used and produced and the severe conditions encountered in a commercial electrolytic application. In this respect it is far superior to the traditional phenolic resin ion-exchange membranes. Second, because the active ion-exchange groups are spread uniformly throughout the membrane and are not concentrated in localized areas which are in turn surrounded by inert polymer areas, as in the case of the membranes composed of ion-exchange beads suspended in inert polymeric sheets, the membranes are physically stronger and less subject to cracking when in contact with the electrolyzing solution. During the hydrolysis and during electrolysis the ion-exchange groups become highly hydrated. When the ion-exchange groups are uniformly distributed throughout the membrane, the internal stress produced is not unduly severe. However, when a high ion-exchange group concentration area such as an ion-exchange bead becomes hydrated, severe stress is produced and the membrane becomes highly susceptible to cracking.

Third, because the membranes of the present invention are polymerized free from any liquid solvent, they are more readily polymerized on a commercial scale, they form stronger and more resistant membranes, and can be more easily handled and stored until ready for use in a cell.

Fourth, because in the membranes of the present invention the ion-exchange groups are uniformly distributed and are not separated by large masses of inert polymers, as in the case of the membranes made from ion-exchange beads, the conductivities are higher than in the case of the heterogeneous membranes of the prior art. Table I below gives a comparison of the conductivities of the membranes of the present invention with those of some heterogeneous membranes of the art.

TABLE I

| Diaphragm | Specific Conductivity (mhos/cm.) |
| --- | --- |
| Amberplex C-1 | $1.06 \times 10^{-3}$ |
| Permutit Cation Diaphragm No. 743 | $0.88 \times 10^{-3}$ |
| Diaphragm of Example 3, below | $7 \times 10^{-3}$ |

For all the conductivity measurements of the above, a $\frac{1}{10}$ M sodium chloride solution was used. Amberplex C-1 is a membrane composed of ion-exchange beads which are the polymerization product of sulfonated styrene and divinylbenzene and which are subsequently imbedded in a polyethylene sheet, the proportions being 70–75 parts polyethylene; 20–25 percent sulfonated polystyrene and 6–8 percent divinylbenzene. Permutit cationic diaphragm No. 747 is a mixture of 25 grams methacrylic acid and one gram divinylbenzene, also imbedded in an inert sheet of polyethylene. Since the membrane of the present invention is more conductive than both of those shown above, they may be used in a thicker form, as a result of which they will have a much longer useful life.

The following examples will serve to illustrate the present invention and the improvements resulting therefrom.

*Example 1*

A casting mold was prepared by separating two pieces of plate glass by a tubular piece of rubber used as a gasket. The glass mold was then placed in a rectangular wooden reinforced frame. Bolts were placed through the outer edges of the wood frame. Each bolt was fitted with a coil type spring, washers, and wing nuts. The springs served to keep pressure on the casting during polymerization. Two hypodermic needles were inserted in one corner of the glass mold between the glass and the rubber gasket, permitting the filling of the mold with the casting material and allowing an escape vent for the displaced air.

*Example 2*

A large Erlenmeyer flask was charged with one thousand grams of styrene, 316.5 grams of ethyl acrylate, 150 grams of maleic anhydride, 54.7 grams of divinylbenzene-ethyl styrene solution containing 56.2 percent divinylbenzene, and 15 grams of benzoyl peroxide. The mixture was stirred until all solids dissolved. Then the solution was filtered. This monomeric solution was then placed in a separatory funnel in an elevated position. A piece of plastic tubing was attached to the funnel and to one of the needles of the mold prepared above in Example 1. The solution was then allowed to flow into the casting mold. When the mold was filled, the needles were removed and the mold placed in a vertical position to test for leaks. It was then lowered into a chest lined with steam-heated copper coils which had been preheated to 72 to 75 degrees centigrade. Polymerization took place within one hour, but the filled mold was allowed to remain in the cabinet for a total of 18 hours. It was then cooled to room temperature, removed from the chest, and the glass plates separated from the casting. The resulting casting was a rigid polymeric sheet, which was trimmed free of the gasket. The sheet was now rigid, had good strength and was substantially free from any liquid solvent.

*Example 3*

The sheet prepared above in Example 2 was treated to convert the ester-substituted carboxylates to sodium salts of carboxylic acids, and in addition to introduce water into the membrane so that the cations and their charge could be transported through the membrane. For this purpose the sheet produced above was placed in a tank containing 17 percent sodium hydroxide which had been heated to a temperature of 90 to 100 degrees centigrade. The sheet was then left in the tank until the dimensions no longer changed, the completion of this step requiring about 3 to 4 days. During this time the sheet had increased approximately 41 percent in length and width. It was quite pliable, translucent, and tough. It had a high tensile strength. As thus prepared, the sheet was ready for use as a cation-exchange diaphragm for the purpose of electrolyzing a salt solution.

*Example 4*

The membrane produced above in Example 3 was placed in a two-compartment test cell in order to test its usefulness in producing chlorine and caustic soda. The test cell comprised a vessel containing two compartments which were separated from each other by the membrane produced above. Sodium chlorine brine was fed continuously at approximately 25.5 percent sodium chloride and was depleted to approximately 22 to 23 percent sodium chloride. Water was added continuously to the cathode compartment to maintain a concentration of approximately 25 to 40 grams per liter of sodium hydroxide. The anode consisted of a graphite block, and the cathode of a steel screen. The membrane was spaced from the anode by a one-fourth inch thick soft rubber gasket. The cathode screen was placed in contact with the diaphragm and spaced one-half inch from the steel back plate of the cell. The active area of the diaphragm was 7.9 square inches. The voltage was adjusted to pass a 5 ampere current through the cell, or a current density of 91 amperes per square foot of membrane. Chlorine was continuously produced at the anode, hydrogen at the cathode, and substantially pure sodium hydroxide in the cathode compartment. The membrane exhibited high current efficiency and a long useful life.

The following examples demonstrate the methods by which the various properties of the membranes of the present invention were determined.

Example 5

For the purpose of determining the relative number of equivalents of hydrolyzable groups in the membrane as formed in Example 2, the following procedure was followed: The cast sheet of a dry polymeric ion-exchange membrane as produced above in Example 2, approximately 3 by 4 inches in size, was laid on the bottom of a four liter breaker and two hundred cc. of standard 20 percent sodium hydroxide was piped into the beaker. After covering with a watch glass, the beaker was heated on a steam bath until hydrolysis was complete with this process requiring from one to four days. During this period the level of the liquid in the beaker was maintained approximately at the starting level by the addition of distilled water. At the end of the heating period the aqueous solution was carefully poured into a 1 liter volumetric flask using distilled water to wash in all traces of the caustic solution. The hydrolyzed membrane was then washed successively with 50 cc. of distilled water, 250 cc. portions of 10 percent brine, and again with 50 cc. of distilled water. The washing was done by swirling the wash liquid around the membrane in the bottom of the beaker for a ten minute period. Each successive wash was added to the volumetric flask in the manner described above. After the transfer of all the washes the volume of the liquid in the volumetric flask was adjusted to the mark with distilled water, the flask shaken to insure thorough mixing and a 25 cc. sample of the resulting solution tritrated with 0.1 N sulfuric acid using methyl orange as the indicator. The total amount of caustic utilized during the hydrolysis was then calculated and this amount related to the number of equivalents of hydrolyzable groups available in a membrane.

Example 6

Current efficiency was determined in the following manner: The membrane was placed in a two-compartment cell as described above in Example 4. Twenty-two percent brine solution was continuously added to the anode compartment, and water was added to the cathode compartment at a rate sufficient to permit the generation of about 3 percent caustic soda. The total amount of charge was measured by an ampere-hour meter. The catholyte overflow liquor was collected and the amount of caustic produced within the period of time was analyzed. The theoretical amount of equivalents of caustic soda was determined from calculation of the amount of electrical charge which had passed during the measurement period. The current efficiency was then obtained by dividing the equivalents of caustic soda analyzed by the amount that should theoretically have been formed by the amount of electricity passed and multiplying this quotient by 100. The following is the calculation used:

$$\text{Equiv. passed theory} = \frac{\text{Total ampere hours}}{\frac{96{,}500}{3{,}600}} = \text{equiv. caustic theory}$$

$$CE = \frac{\text{Equiv. caustic by analysis} \times 100}{\text{Equiv. caustic by theory}}$$

Example 7

The membrane life test was performed as follows: The membrane was placed in a two-compartment 5 ampere cell as described in Example 4. Brine was allowed to flow into the anode compartment and water into the cathode compartment. The water flow was adjusted to generate 3 percent caustic in the catholyte. Failures in the membrane were detected by periodically testing the catholytic exhaust for high chloride content with silver nitrate solution.

Example 8

The permselectivity of the ion-exchange membranes was determined as follows:

Permselectivity may be defined mathematically as follows:

(1) $\text{permselectivity} = \dfrac{{}^t\text{mobile ion} - {}^{t^\circ}\text{mobile ion}}{1 - {}^{t^\circ}\text{mobile ion}}$ Where:

${}^t$Mobile ion = transference number of the mobile ion in the membrane.
${}^{t^\circ}$Mobile ion = transference number of the mobile ion in free solution. Values for transference numbers are obtained from the literature for the particular electrolyte and the concentrations used.

(2) Mathematically $${}^t\text{mobile ion} = \frac{E + E_0}{2E_0}$$

$E$ = measured voltage (3) $E_0 = (t_+ - t_-)\left(\dfrac{RT}{F}\right) \ln \dfrac{a_2^\pm}{a_1^\pm}$ Where:

$t_+$ = transference number of the positive ion
$t_-$ = transference number of the negative ion
$R$ = gas constant
$T$ = absolute temperature
$F$ = 96,500 coulombs (Faraday)
$a_1, a_2$ = molal activities of the electrolytes on each side of the membrane The procedure for determination of permselectivity was as follows: The wet preconditioned membrane was clamped in a two-compartment cell. Into each compartment were continuously passed dilute sodium chloride solutions. The concentration of the solutions was accurately known and the one solution had about twice the salt concentration of the other. The concentrations were on the order of 0.1 N–0.01 N in most of the determinations. The potential developed across the membrane by this cell (E) was measured (using silver-silver chloride standard electrodes, one immersed in each compartment in series with the membranes) by a sensitive potentiometer.

The value of $E_0$ in the Equation 3 above was readily caluated from the known value of the salt concentration (from which the activities $a_1 \mp a_2$ were easily calculated using literature values for the activity coefficients). The transference numbers $t_+$, $t_-$ were readily available in the literature from the known activities of the ions.

With E and $E_0$ known the value of ${}^t$mobile ion in Equation 2 above was readily calculated. Then from Equation 1 the permselectivity of the membrane was determined.

The examples listed in Table II below contain data for membrane composition and performance in a test cell of a number of the various species of the present invention. In every case below the one membrane two-compartment cell described in Example 4 above, was used for testing purposes. The properties of the membranes were tested according to the methods described in the examples above.

TABLE II

| Example Number | Monomer, Grams | | | | Permselectivity, Percent | Current Efficiency, Percent | Life in Days |
| --- | --- | --- | --- | --- | --- | --- | --- |
| | Diluting Monomer | Functional Monomer | Sensitizing Monomer | Cross-Linking Monomer | | | |
| Example 9 | Styrene, 66.5 | Ethyl Acrylate, 22 | Maleic Anhydride, 9.8 | Divinylbenzene Solution, 4.5 | 100 | 94.0 | 36 |
| Example 10 | Styrene, 132.4 | Methyl Acrylate, 41 | Maleic Anhydride, 19.4 | Divinylbenzene Solution, 7.8 | 97.9 | | |
| Example 11 | Styrene, 161 | Methyl Methacrylate, 29.3 | Methacrylic Acid, 28.8 | Divinylbenzene Solution, 5.74 | >85 | 79.0 | 10 |
| Example 12 | Styrene, 157 | Diethylfumarate, 63.2 | Maleic Anhydride, 21.1 | Divinylbenzene Solution, 8.9 | 82.7 | 74.0 | 25 |
| Example 13 | Styrene, 183.5 | Acrylonitrile, 29.8 | Maleic Anhydride, 26.2 | Divinylbenzene Solution, 11.0 | | | |
| Example 14 | Styrene, 163 | Ethylacrylate, 50.3 | Citraconic Anhydride, 26.7 | Divinylbenzene Solution, 9.8 | 83.6 | 69.0 | |
| Example 15 | Styrene, 90.8 | Itaconic Anhydride, 11.2 | | Divinylbenzene Solution, 5.6 | 89 | >80.0 | |
| Example 16 | Styrene, 159 | Acrylic acid, 77.5 | | Divinylbenzene Solution, 14 | >80 | 63.0 | 20 |
| Example 17 | Styrene, 50 | 2-ethylhexylacrylate, 8.55; Ethylacrylate, 34 | Maleic Anhydride, 4.7 | Divinylbenzene Solution, 4.7 | >95 | 93.0 | 39 |

The divinylbenzene solution was made up of 52 percent divinylbenzene and 48 percent ethyl styrene. One percent benzoyl peroxide was used as a catalyst in every case. Where the values are left blank, the corresponding measurement was not made.

The following example demonstrates a membrane which contains no cross-linking agent.

*Example 18*

A large Erlenmeyer flask was charged with 900 grams styrene and 100 grams maleic anhydride and 10 grams of benzoyl peroxide. The mixture was then placed in a casting mold and polymerized according to the method of Example 2. The solid sheet was then treated according to the method described in Example 3, in order to introduce water of hydration. This membrane exhibited a permselectivity of 94.9 percent. When tested in a single membrane cell for the production of chlorine and caustic soda as described above, the membrane had a useful life of 42 days.

The following examples illustrate the production and testing of permselective membranes included within the present invention in a three-compartment cell containing two cation permselective membranes for the simultaneous production of potassium hydroxide and potassium carbonate.

*Example 19*

A solution of 132 grams styrene, 41 grams methyl methacrylate, 19.4 grams maleic anhydride, 7.8 grams of divinylbenzene ethyl styrene solution containing 52 percent divinylbenzene, and 2 grams of benzoyl peroxide were mixed to effect solution, and were poured into a casting cell. This cell consisted of two rectangular sheets of one-fourth inch plate glass separated by a flexible rubber tubing gasket. The glass cell was contained in a wooden frame constructed in such a manner that pressure could be continuously applied to the exterior of the glass cell by bolts and springs or rubber tubing. The casting cell was then placed in an oven heated to 62 degrees centigrade and held there for 16 hours. At this point the temperature was raised to 95–100 degrees centigrade and held there for three hours. The rigid polymeric sheet was then removed.

Pieces of this sheet were cut and placed in 90–95 degrees centigrade 13 percent potassium hydroxide for one to two weeks. The rigid but more pliable membrane now containing approximately 32–40 percent water was capable of conducting current in an electrolytic solution in an ion-selective manner. It indicated a permselectivity of 97.9 percent in a two-compartment concentration cell using electrolyte of approximately 0.1 and 0.01 N in each compartment.

*Example 20*

The membrane produced as in the example above was placed in a three-compartment electrolytic cell and used for the production of potassium hydroxide and potassium carbonate. This cell comprised a container, an anode compartment which contained a graphite anode and which was separated from the center compartment by a cationic permselective diaphragm of this invention, and a cathode compartment which contained a steel cathode and which was separated from a center compartment by a similar cationic permselective membrane. This cell is disclosed in copending application for "Method and Apparatus for Electrolysis," Serial No. 327,182, filed December 22, 1952, by Sidney G. Osborne and George T. Miller, now abandoned. The anode compartment contained a 25 percent potassium chloride solution which was separated from a center compartment by the permselective membrane described above. The center compartment contained 20 percent potassium carbonate. The cathode compartment contained a 40 percent potassium hydroxide solution. When the current was applied through the electrodes of the cell, chloride ions were discharged at the anode with the production of chlorine, while the potassium ions were attracted toward the cathode with the production of hydrogen and potassium hydroxide. The cationic ion exchange membranes acted as a negatively charged screen and allowed the passage of the positively charged potassium ion into the cathode compartment by a series of transfers along the carboxylic acid groups incorporated in the membrane. The reverse passage of negative ions from the anode or cathode compartments was prevented by the negatively charged carboxylic acid groups which tended to repel the anions. Hydrogen ions were discharged at the cathode with the production of hydrogen gas while at the same time the migration of the potassium ions into the cathode compartment resulted in the production of potassium hydroxide in the compartment. During the operation of the cell, the brine concentration in the anode compartment was maintained at the saturation point by passing the exit brine through a bed of potassium chloride before recirculating back through the anode compartment. The caustic potash produced in the center compartment was periodically converted to potassium carbonate by circulating the solution from the compartment through a carbonating tower where the caustic carbonate was neutralized with carbon dioxide gas. Part of this circulating carbonate solution was continually removed as an end product. The concentration of the potassium hydroxide in the cathode compartment was maintained close to the saturation point by the continual removal of the part of the solution from the cathode compartment as a product. A current density of 90 amperes per square foot was maintained with respect to the diaphragms, requiring a voltage of about 4.6 volts. At the end of the process very pure potassium hydroxide and potassium carbonate were obtained in excellent yield.

The economical operation of this cell is dependent upon the efficiency of the two ion exchange membranes in separating the cell into three compartments. If these ions "sieves" are operating at high efficiency, hydroxyl ions are prevented from migrating into the anode compartment under the influence of the electric field. This results in a high cell current efficiency and in the production of chlorine which is free from oxygen. Another function of the permselective membranes is to prevent the diffusion of chloride ions from the anode compartment into the center and cathode compartments. Prevention of this diffusion results in the production of very pure grades of potassium carbonate and potassium hydroxide, both of which are substantially free from chloride ions.

The cation permselective diaphragms of the present invention may also be used to electrolyze organic salts such as sodium acetate to produce acetic acid. This process is also carried out in a three-compartment cell and is disclosed in copending application Serial No. 346,365, filed April 2, 1953, now Patent No. 2,967,806, by Sidney G. Osborne and George T. Miller. Here two cation permselective membranes separate a center compartment from both the anode compartment and the cathode compartment. The salt such as sodium formate or sodium oxylate is placed in a center compartment and upon the application of electrical current, the cations migrate to the cathode compartment and the acid remains in the center compartment.

It has been additionally found that the principles of the present invention may be utilized to prepare novel anion permselective membranes. This results in a copolymeric type diaphragm which is composed of a homogeneous copolymer which contains attached thereto and uniformly distributed throughout anion exchange groups rendering the membrane anionically permselective. The following example describes this preparation.

*Example 21*

A solution of 31.2 grams styrene, 19.1 grams 4-vinyl pyridine, 2.3 grams of divinylbenzene-ethyl styrene solution, and 0.05 gram of benzoyl peroxide was prepared in an Erlenmeyer flask. This solution was placed in a casting mold described above. The mold containing the solution was placed in an oven and maintained at 75 degrees centigrade for 19 hours. A clear, rigid, amber-colored plastic sheet was obtained.

This sheet was then placed in 20 percent hot sulfuric acid solution maintained at 90 to 95 degrees centigrade. This treatment continued until the sheet had swelled about 80 percent in volume. In this form it was electrically conductive, had a permselectivity greater than 85 percent, and operated satisfactorily as an anion permselective membrane.

The anion permselective membrane produced above in Example 21 may be used in cells either alone or in conjunction with the cation permselective membrane of this invention for a large number of uses. One such use is described in copending application Serial No. 267,846, filed January 23, 1952, by Sidney G. Osborne and George T. Miller, which discloses the electrolysis of sodium sulfate solution in a three-compartment electrolytic cell. In this cell the salt is introduced into the center compartment which is separated from the cathode compartment by a cation permselective membrane, and which is separated from the anode compartment by an anion permselective membrane. A graphite anode and a steel cathode are inserted and a current applied to the electrodes. The operation of this cell results in the production of sulfuric acid. Another use of this membrane in conjunction with the cation permselective membranes of this invention is in the de-ionization of seat water. The method for so doing is widely described in literature and particularly in United States Patent No. 2,694,680 which discloses a method of alternately using a plurality of anion and cation permselective membranes to transfer electrolytes from one solution to another and thus effect a removal of ions from the material which it is desired to purify. As stated therein, this method may be used to remove electrolytic impurities from solutions of non-electrolytes, remove salts from glycerine by-products of soap manufacture, and demineralize sea water to render it fit for human consumption.

We claim:

1. A process for the production of a solid, resinous, permselective membrane which consists essentially of polymerizing a mixture consisting essentially of (I) an addition polymerization catalyst, and (II) a mixture of monomers capable of addition copolymerization consisting essentially of (A) an ion-exchange-active material selected from the group consisting of (1) a polymerizable olefinic monomer containing a carboxylic group, (2) a polymerizable olefinic monomer containing a group which may be subsequently hydrolyzed to form a carboxylic group, (3) mixtures of (1) and (2), and (4) a polymerizable olefinic monomer containing an anion-exchange group, and (B) a polymerizable ion-exchange-inactive monomeric diluent selected from the group consisting of (a) a polymerizable olefinic monomer, (b) a cross-linking olefinic monomer containing at least two polymerizable carbon-to-carbon double bonds in an amount not more than 8.0 mol percent of the copolymeric composition, and (c) mixtures of (a) and (b); producing a dry homogeneous polymerized membrane; and subsequently converting the potentially active functional groups to ion-exchange groups and introducing water of hydration into the membrane by hydrolyzing in an aqueous solution containing a hydrolysis catalyst to the extent necessary to produce ion-exchange groups uniformly distributed throughout said membrane in an amount from about one to about six milliequivalents per gram of dry membrane.

2. A permselective membrane formed in accordance with the process of claim 1.

3. A homogeneous solid resinous anionic permselective membrane according to claim 2 wherein the polymerization product is a mixture consisting essentially of (I) an addition polymerization catalyst and (II) a mixture of polymerized monomers capable of addition copolymerization consisting essentially of (A) a polymerizable olefinic monomer containing an anion-exchange group; (B) a polymerizable ion-exchange-inactive olefinic monomer; and (C) a cross-linking olefinic monomer containing at least two polymerizable carbon-to-carbon double bonds, said cross-linking olefinic monomer being present in an amount not more than 8.0 mol percent of the dry copolymeric composition.

4. A process for the production of a dry solid resinous cationic permselective membrane which consists essentially of polymerizing a mixture consisting essentially of (I) an addition polymerization catalyst and (II) a mixture of monomers capable of addition copolymerization consisting essentially of (A) an ion-exchange-active material selected from the group consisting of (1) a polymerizable olefinic monomer containing a carboxylic group and (2) a polymerizable olefinic monomer containing a radical which may be hydrolyzed to form a carboxyl group and which additionalyl contains in admixture a polymerizable olefinic carboxylic compound, (B) a polymerizable ion-exchange-inactive olefinic monomer, and (C) a cross-linking olefinic monomer containing at least two polymerizable carbon-to-carbon double bonds; producing a dry homogeneous polymerized membrane; and subsequently converting the potentially active functional groups to carboxyl groups and introducing water of hydration into the membrane by hydrolyzing it in an aqueous solution containing a hydrolysis catalyst to the extent necessary to produce carboxyl groups uniformly distributed throughout said membrane in an amount from about one to about six milliequivalents per gram of dry membrane.

5. A process according to claim 4 wherein said olefinic monomer containing a group which may be subsequently hydrolyzed to form a carboxyl group is a carboxylic ester.

6. A process according to claim 4 wherein said olefinic monomer containing a group which may be subsequently hydrolyzed to form a carboxyl group is an ester of acrylic acid.

7. A process according to claim 4 wherein said olefinic monomer containing a carboxylic group is acrylic acid.

8. A process according to claim 4 wherein said olefinic monomer containing a group which may be subsequently hydrolyzed to form a carboxyl group is a carboxylic amide.

9. A process according to claim 4 wherein said olefinic monomer containing a group which may be subsequently hydrolyzed to form a carboxyl group is a nitrile.

10. A permselective membrane formed in accordance with the process of claim 4.

11. A homogeneous solid resinous permselective membrane according to claim 10 wherein said olefinic monomer containing a carboxylic group is acrylic acid.

12. A homogeneous solid resinous permselective membrane according to claim 10 wherein said olefinic monomer containing a carboxylic group is maleic anhydride.

13. A homogeneous solid resinous permselective membrane according to claim 10 wherein the polymerization product is a mixture consisting essentially of (A) a mixture of acrylic acid and an ester of acrylic acid, (B) styrene, (C) divinylbenzene, said divinylbenzene being present in an amount not more than 8.0 mol percent of the copolymeric composition, and (D) an addition polymerization catalyst.

14. A homogeneous solid resinous permselective membrane according to claim 10 wherein the polymerization product is a mixture consisting essentially of (A) a mixture of an ester of acrylic acid and maleic anhydride (B) styrene, (C) divinylbenzene, said divinylbenzene being present in an amount not more than 8.0 mol percent of the copolymeric composition, and (D) an addition polymerization catalyst.

15. A homogeneous solid resinous permselective membrane according to claim 10 wherein (I) is benzoyl peroxide, (IIA) maleic anhydride and (IIB) styrene.

16. A permselective membrane formed in accordance with the process of claim 4 wherein the ion-exchange-active material is present in an amount between about ten percent and about seventy-five percent of the polymerizable material, and containing at least twenty percent water of hydration.

17. A permselective membrane formed in accordance with the process of claim 4 wherein the ion-exchange-active material is present in an amount between about fifteen and about fifty percent, and containing at least twenty percent water of hydration.

18. The process for the production of a homogeneous solid resinous cationic permselective membrane which consists essentially of polymerizing a mixture consisting essentially of (I) an addition polymerization catalyst and (II) a mixture of monomers capable of addition copolymerization consisting essentially of (A) an ion-exchange-active material selected from the group consisting of (1) a polymerizable olefinic monomer containing a carboxylic group (2) a mixture of a polymerizable olefinic monomer containing a carboxylic ester group and a polymerizable olefinic monomer containing a carboxyl group, (3) a mixture of a polymerizable olefinic monomer containing a carboxylic amide group and a polymerizable olefinic monomer containing a carboxyl group, (4) a mixture of a polymerizable olefinic monomer containing a nitrile group and a polymerizable olefinic monomer containing a carboxyl group, and (5) mixtures thereof, (B) a polymerizable ion-exchange-inactive olefinic monomer and (C) a cross-linking olefinic monomer containing at least two polymerizable carbon-to-carbon double bonds, said cross-linking olefinic monomer being present in an amount not more than 8.0 mol percent of the dry copolymeric composition, and said ion-exchange-inactive monomer and cross-linking olefinic monomer being present in said membrane in an amount between about twenty-five mol percent and about ninety mol percent of the dry polymerized materials; producing a dry, homogeneous, polymerized membrane; and subsequently converting the potentially active functional groups to carboxyl groups and introducing water of hydration into the membrane by hydrolyzing in an aqueous solution containing a hydrolysis catalyst to the extent necessary to produce carboxyl groups uniformly distributed throughout said membrane in an amount from about one to about six milliequivalents per gram of dry membrane.

19. The permselective membrane formed in accordance with the process of claim 18.

20. A cell for the electrolytic decomposition of an alkali metal halide which consists essentially of a container, an anode, a cathode, which contains interposed between said anode and said cathode a permselective membrane made in accordance with the process of claim 1.

References Cited in the file of this patent

UNITED STATES PATENTS

| | | |
|---|---|---|
| 2,439,227 | Seymour et al. | Apr. 6, 1948 |
| 2,675,370 | Barrett | Apr. 13, 1954 |
| 2,719,136 | Caldwell | Sept. 27, 1955 |
| 2,730,768 | Clarke | Jan. 17, 1956 |
| 2,731,408 | Clarke | Jan. 17, 1956 |
| 2,891,015 | Tsunoda | June 16, 1959 |